(12) United States Patent
Xiong et al.

(10) Patent No.: US 10,451,647 B2
(45) Date of Patent: Oct. 22, 2019

(54) METHOD AND DEVICE FOR MEASURING SPEED OF PERMANENT MAGNET SYNCHRONOUS MOTOR

(71) Applicant: UBTECH Robotics Corp., Shenzhen (CN)

(72) Inventors: Youjun Xiong, Shenzhen (CN); Wenhua Fan, Shenzhen (CN); Lifu Zhang, Shenzhen (CN); Jianyun Xiao, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 259 days.

(21) Appl. No.: 15/455,062

(22) Filed: Mar. 9, 2017

(65) Prior Publication Data

US 2018/0188282 A1 Jul. 5, 2018

(30) Foreign Application Priority Data

Dec. 31, 2016 (CN) .......................... 2016 1 1266117

(51) Int. Cl.
*G01P 3/481* (2006.01)
*G01D 5/243* (2006.01)

(52) U.S. Cl.
CPC ............. *G01P 3/481* (2013.01); *G01D 5/243* (2013.01)

(58) Field of Classification Search
CPC .................................. G01P 3/481; G01D 5/243
See application file for complete search history.

(56) References Cited

U.S. PATENT DOCUMENTS 5,650,779 A * 7/1997 Sugden ................ H02K 29/10
318/701
2009/0150116 A1* 6/2009 Lin ........................ G01P 3/481
702/145

(Continued)

FOREIGN PATENT DOCUMENTS

CN 102680726 A 9/2012

*Primary Examiner* — Patrick Assouad

(57) ABSTRACT

A method for measuring speed of a permanent magnet synchronous motor includes: acquiring a number K of pulse signals received in a current measuring period and outputted by an incremental encoder; acquiring a first duration $S_{n-1}$ between a time point when a pulse is last received in a previous measuring period and a time point when the previous measuring period ends, and a second duration $S_n$ between a time point when a pulse is last received in the current measuring period and a time point when the current measuring period ends; calculating a third duration T0, measured between the time point when the pulse is last received in the previous measuring period and the time point when the pulse is last received in the current measuring period, according to the length T of the current, measuring period, the first duration $S_{n-1}$ and the second duration $S_n$; and calculating a motor speed v according to formula:

$$v = \frac{K}{K_0} \times \frac{1}{T0}.$$

17 Claims, 7 Drawing Sheets

(56) References Cited

U.S. PATENT DOCUMENTS

2011/0127938 A1* 6/2011 Kawakami ............. G01P 3/481
318/400.13
2016/0077121 A1* 3/2016 Lee ..................... G01P 3/481
702/147

* cited by examiner

METHOD AND DEVICE FOR MEASURING SPEED OF PERMANENT MAGNET SYNCHRONOUS MOTOR

CROSS REFERENCE TO RELATED APPLICATIONS

This application claims priority to Chinese Patent Application No. 201611266117.X, filed Dec. 31, 2016, which is hereby incorporated by reference herein as if set forth in its entirety.

BACKGROUND

1. Technical Field

The present disclosure generally relates to motor speed measuring technology, and particularly to a method and a device for measuring the speed of a permanent magnet synchronous motor.

2. Description of Related Art

Permanent magnet synchronous motors are widely used. For example, they can be used in many scenarios for speed control. The accuracy of speed control is thus an important index to evaluating motor control systems.

Typically, two methods, T method and M method, can be used for measuring motor speed. The T method measures the time between two pulses, and the M method measures the number of the pulses detected in a certain time. In the case of low rotation speed, the counted values between two pulses obtained by using the T method are usually big and the error is small. In the case of high rotation speed, the counted values between two pulses obtained by using the T method are usually small and the error is big. As for the M method, in the case of high rotation speed, the number of the pulses detected in a certain time is usually big and the error is small. In the case of low rotation speed, the number of the pulses detected in a certain time is usually small and the error is big.

Although the T method has a high accuracy in the case of low motor speed and the M method has a high accuracy in the case of high motor speed, they both have low accuracy in the opposite case. That is, each of the T method and the M method cannot have high measuring accuracy in the case of high motor rotation speed and low motor rotation speed, which cannot meet the requirement for the control of motors running at high speed and low speed.

SUMMARY

A method for measuring speed of a permanent magnet synchronous motor includes: acquiring a number K of pulse signals received, in a current measuring period and outputted by an incremental encoder, the current measuring period having a length of T; acquiring a first duration $S_{n-1}$ measured between a time point when a pulse is last received in a previous measuring period and a time point when the previous measuring period ends, and a second duration $S_n$ measured between a time point when a pulse is last received in the current measuring period and a time point when the current measuring period ends; calculating a third duration T0, measured between the time point when the pulse is last received in the previous measuring period and the time point when the pulse is last received in the current measuring period, according to the length T of the current measuring period, the first duration $S_{n-1}$ and the second duration $S_n$; and calculating a motor speed v according to the following formula:

$$v = \frac{K}{K_0} \times \frac{1}{T0},$$

where $K_0$ is a number of the pulses outputted by the incremental encoder when the permanent magnet synchronous motor rotates for one revolution.

A device for measuring speed of a permanent magnet synchronous motor includes: a counter configured to acquire a number K of pulse signals received in a current measuring period and outputted by an, incremental encoder, the current measuring period having a length of T; a timing module configured to acquire a first duration $S_{n-1}$ measured between a time point when a pulse is last received in a previous measuring period and a time point when the previous measuring period ends, and a second duration measured between a time point when a pulse is last received in the current measuring period and a time point when the current measuring period ends; a first calculating module configured to calculate a third duration T0, measured between the time point when the pulse is last received in the previous measuring period and the time point when the pulse is last received in the current measuring period, according to the length T of the current measuring period, the first duration $S_{n-1}$ and the second duration $S_n$; and a second calculating module configured to calculate a motor speed v according to the following formula:

$$v = \frac{K}{K_0} \times \frac{1}{T0},$$

where $K_0$ is a number of the pulses outputted by the incremental encoder when the permanent magnet synchronous motor rotates for one revolution.

A device for measuring speed of a permanent magnet synchronous motor includes: a processor; and a storage unit for storing a plurality of program instructions that, when executed by the processor, perform the step of: acquiring a number K of pulse signals received in a current measuring period and outputted by an incremental encoder, the current measuring period having a length of T; acquiring a first duration $S_{n-1}$ measured between a time point when a pulse is last received in a previous measuring period and a time point when the previous measuring period ends, and a second duration $S_n$ measured between a time point when a pulse is last received in the current measuring period and a time point when the current measuring period ends; calculating a third duration T0, measured between the time point when the pulse is last received in the previous measuring period and the time point when the pulse is last received in the current measuring period, according to the length T of the current measuring period, the first duration $S_{n-1}$ and the second duration $S_n$; and calculating a motor speed v according to the following formula:

$$v = \frac{K}{K_0} \times \frac{1}{T0},$$

where $K_0$ is a number of the pulses outputted by the incremental encoder when the permanent magnet synchronous motor rotates for one revolution.

Compared with conventional methods for measuring motor speed, the method of the present disclosure has the advantages that, by acquiring a first duration $S_{n-1}$ measured between a time point when a pulse is last received in a previous measuring period and a time point when the previous measuring period ends, and a second duration $S_n$ measured between a time point when a pulse is last received in the current measuring period and a time point when the current measuring period ends, the exact time corresponding to the motor rotation angle represented by the K complete pulse signals is accurately calculated, and the speed of the permanent magnet synchronous motor can be detected more accurately without being affected no matter whether the motor runs at high speed or low speed. The method of the present disclosure is an improved M method. The improvement is that, no matter what speed the motor runs at, the number of pulses corresponding to the time is accurate. After a certain number of pulses are detected, the time corresponding to the pulses is corrected to acquire a true corresponding time. In this case, since the number of pulses and the corresponding time are very accurate, the calculated speed is thus accurate.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
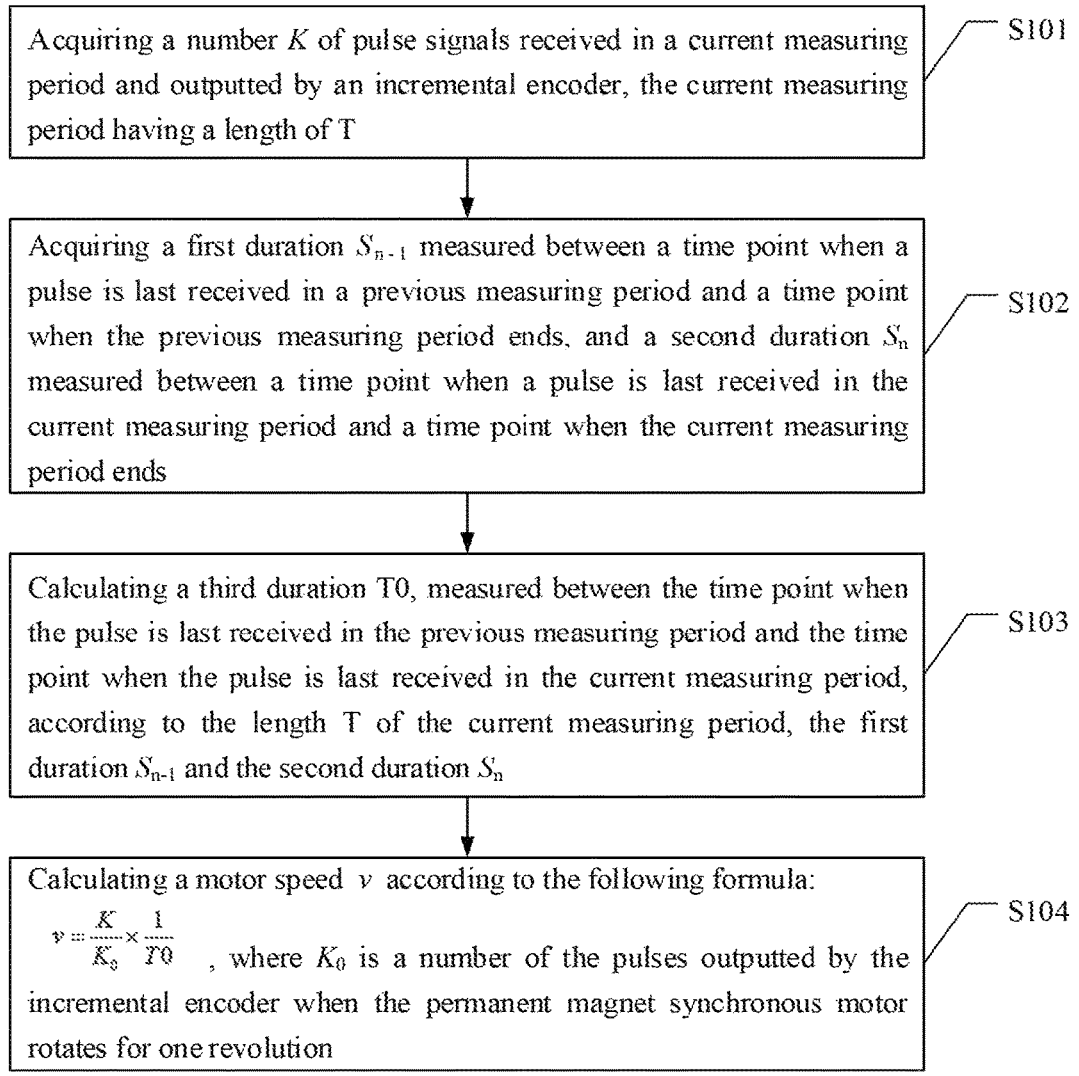
FIG. 1 is a schematic flow chart of a method for measuring the speed of a permanent magnet synchronous motor according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Embodiment 1

A method for measuring the speed of a permanent magnet synchronous motor as shown in FIG. 1 includes steps S101-S104. The method will now be described in conjunction with FIG. 2.

A permanent magnet synchronous motor includes an incremental encoder that can measure the number of pulses generated during the rotation of a rotor of the motor. The number of pulses reflects the change of rotation angle of the rotor. The 0, 1, K in FIG. 2 represent receiving a pulse signal at corresponding positions.

Step S101: acquiring a number K of pulse signals received in a current measuring period and outputted by an incremental encoder, where K is not equal to 0 and the current measuring period has a length of T.

Figure 2:
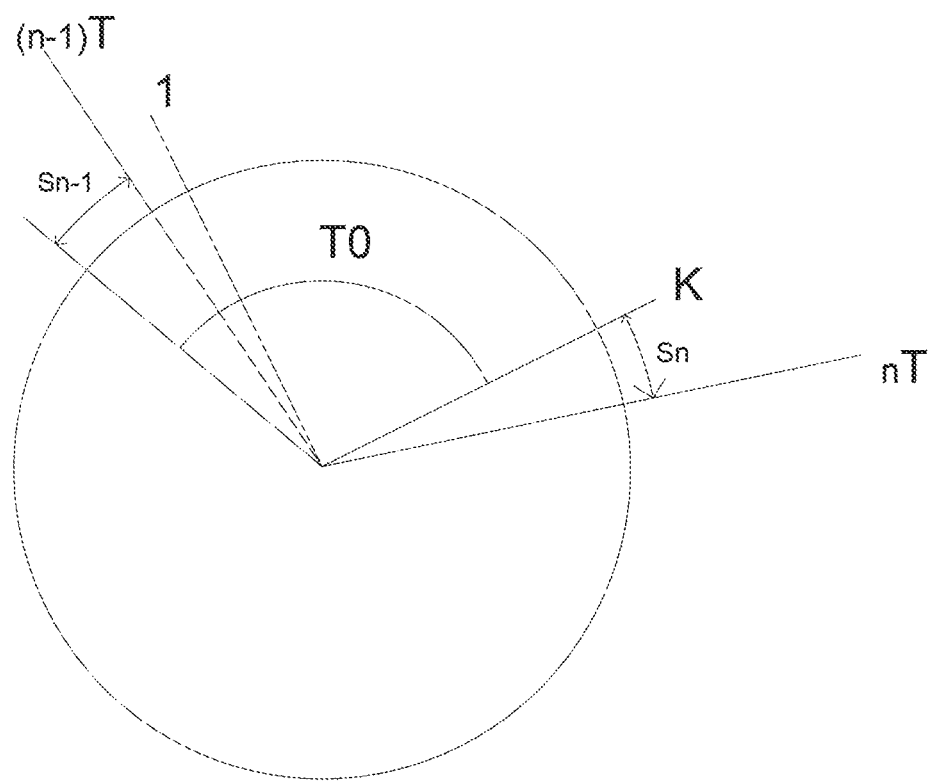
FIG. 2 is a diagram showing the principle of the method of FIG. 1.

Specifically, the angle (or arc length) between (n−1)T to nT in FIG. 2 indicates the nth measuring period in which the first to kth pulse signals are received.

In one embodiment, the step of acquiring a number K of pulse signals received in a current measuring period and outputted by an incremental encoder, includes:

setting a value of a counter that acquires the pulse signals to zero when the current measuring period starts, and the value of the counter when the current measuring period ends is determined to be the number of pulse signals received in the current measuring period and outputted by the incremental encoder. In this way, counter overflow can be avoided and the amount of computation can be reduced.

Step S102: acquiring a first duration $S_{n-1}$ measured between a time point when a pulse is last received in a previous measuring period and a time point when the previous measuring period ends, and a second duration $S_n$ measured between a time point when a pulse is last received in the current measuring period and a time point when the current measuring period ends.

Specifically, the position "0" in FIG. 2 indicates that the pulse signal is fast received in the (n−1)th measuring period. It takes the time of the first duration $S_{n-1}$ from the position "0" to the position "(n−1)T" where the measuring period terminates. The position "K" in FIG. 2 indicates that the Kth pulse signal is last received in the nth measuring period. It takes the time of the second duration $S_n$ from the position "K" to the position "nT" where the measuring period terminates.

Figure 3:
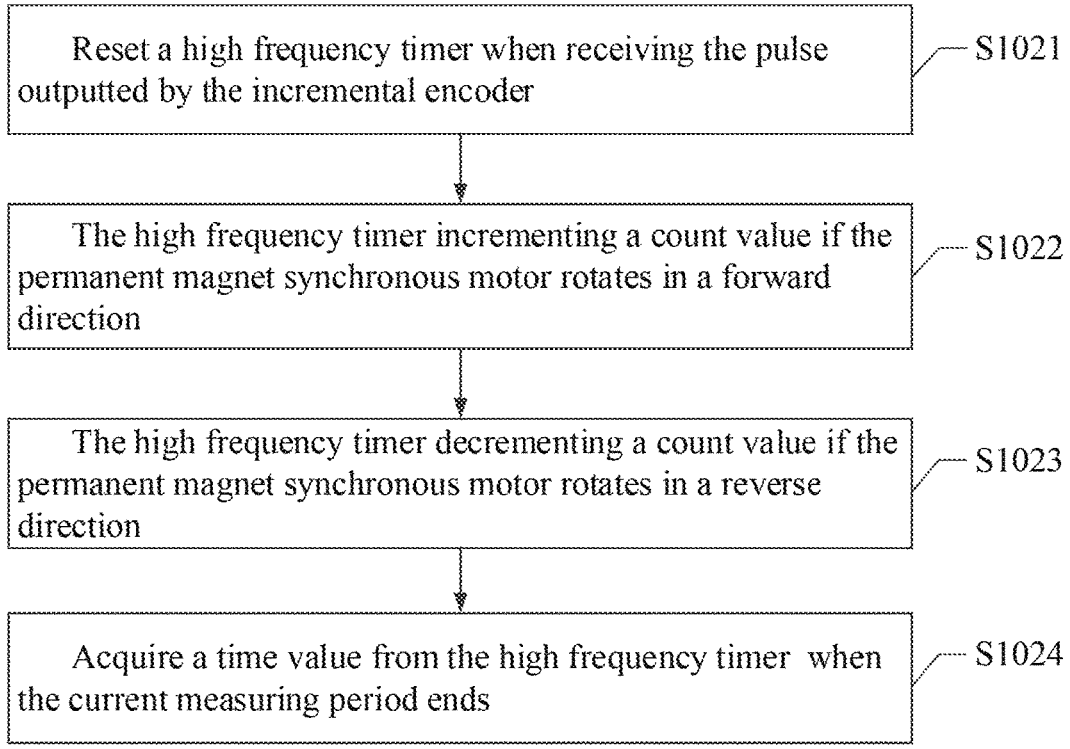
FIG. 3 is a schematic flow chart of acquiring a second duration $S_n$ of the FIG. 1 according to one embodiment.

In one embodiment, as shown in FIG. 3, the step of acquiring second duration $S_n$ measured between a time point when a pulse is last received in the current measuring period and a time point when the current measuring period ends, includes:

Step S1021: resetting a high frequency timer when receiving the pulse outputted by the incremental encoder;

Step S1022: the high frequency timer incrementing a count value if the permanent magnet synchronous motor rotates in a forward direction:

Step S1023: the high frequency timer decrementing a count value if the permanent magnet synchronous motor rotates in a reverse direction; and Step S1024: acquiring a time value from the high frequency tinier as the second duration $S_n$ when the current measuring period ends.

The second duration becomes the first duration measured from the pulse signal is last received in the previous measuring period to the end of the previous measuring period when the current measuring period ends and the next measuring period starts.

Setting the counting of the high frequency timer to be related to the rotational direction of the motor. When the motor rotates in a forward direction, the high frequency timer increments a count value. When the motor rotates in a reverse direction, the high frequency timer decrements a count value. The high frequency timer will be reset each time a pulse signal is received. In this way, the second duration $S_n$ between a time point when a pulse is last received in the current measuring period and a time point when the current measuring period ends can be measured. In the embodiment, the forward/reverse rotation of the motor is related to the working manner of a photoelectric encoder or a magnetic encoder.

Step S103: calculating a third duration T0, measured between the time point when the pulse is last received in the previous measuring period and the time point when the pulse is last received in the current measuring period, according to the length T of the current measuring period, the first duration $S_{n-1}$ and the second duration $S_n$.

Specifically, in the circumstance shown in FIG. 2 indicating that the motor rotates in a forward direction, the third duration $T0=T-S_n+S_{n-1}$. In another circumstance when the motor rotates in a reverse direction, the third duration $T0=T-S_{n-1}+S_n$.

Step S104: calculating a motor speed v according to the following formula:

$$v = \frac{K}{K_0} \times \frac{1}{T0},$$

where $K_0$ is a number of the pulses outputted by the incremental encoder when the permanent magnet synchronous motor rotates for one revolution. $K/K_0$ is the number of the revolutions the motor has rotated. It should be noted that when the maximum rotation angle of motor is not 360 degrees, the $K_0$ corresponding to the maximum rotation angle can be determined according to the proportion between the maximum rotation angle and 360 degrees.

FIG. 2 shows clearly that K complete pulse signals corresponding to the positions "0" through "K" are detected during a duration T0. No matter whether the motor runs at high speed or low speed, the duration T0 reflects the exact time corresponding to the rotation angle of motor which is represented by the K complete pulse signals. If the motor has rotated for $K/K_0$ revolutions, the rotation speed can be calculated according to $K/K_0/T0$. If the length of the current measuring period is T and the unit of the first duration $S_{n-1}$ and the second duration $S_n$ is second, the unit of the rotation speed is revolutions per second.

The method of the present disclosure has the advantages that, by acquiring a first duration $S_{n-1}$ measured between a time point when a pulse is last received in a previous measuring period and a time point when the previous measuring period ends, and a second duration $S_n$ measured between a time point when a pulse is last received in the current measuring period and a time point when the current measuring period ends, the exact time corresponding to the motor rotation angle represented by the K complete pulse signals is accurately calculated, and the speed of the permanent magnet synchronous motor can be detected more accurately without being affected no matter whether the motor runs at high speed or low speed.

Specifically, the current measuring period is started and terminated by an interruption timer, and the length T of the current measuring period equals to a ratio of a preset value of the interruption timer to an interruption clock frequency. The time value from the high frequency timer equals to a ratio of the count value in a register of the high frequency timer to clock frequency of the high frequency timer. The clock frequency of the interruption timer and the clock frequency of the high frequency timer can be the same or different.

Further, the interruption timer is a low frequency timer, and is set to have a long interruption period T. The high frequency timer has a big counting rate, a short period, and a high time accuracy, and can guarantee the measuring accuracy. The two can be used to ensure that the measuring accuracy and save computing resources.

Embodiment 2

Figure 4:
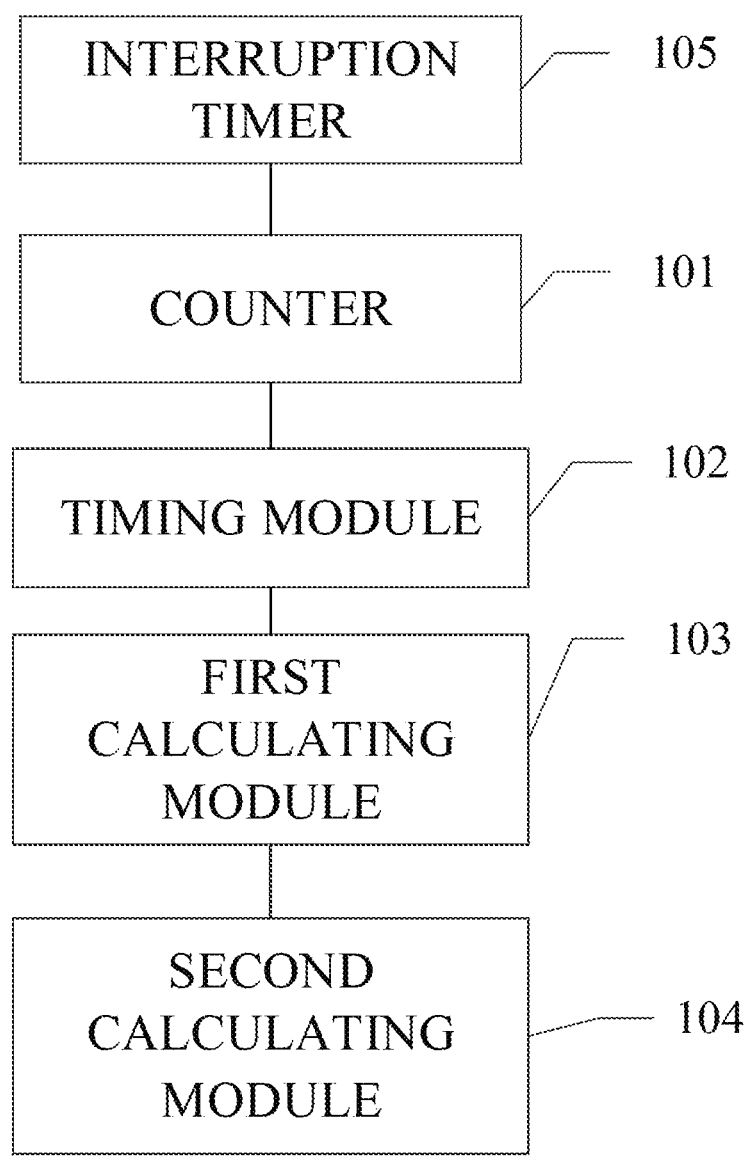
FIG. 4 is a block diagram of a device for measuring the speed of a permanent magnet synchronous motor according to one embodiment.

A device for measuring speed of a permanent magnet synchronous motor, as shown in FIG. 4, includes:

a counter 101 used to acquire a number K of pulse signals received in a current measuring period and outputted by an incremental encoder, where K is not equal to 0 and the current measuring period has a length of T;

a timing module 102 used to acquire a first duration $S_{n-1}$ measured between a time point when a pulse is last received in a previous measuring period and a time point when the previous measuring period ends, and a second duration $S_n$ measured between a time point when a pulse is last received in the current measuring period and a time point when the current measuring period ends;

a first calculating module 103 used to calculate a third duration T0, measured between the time point when the pulse is last received in the previous measuring period and the time point when the pulse is last received in the current measuring period, according to the length T of the current measuring period, the first duration and the second duration $S_n$; and a second calculating module 104 used to calculate a motor speed v according to the following formula:

$$v = \frac{K}{K_0} \times \frac{1}{T0},$$

where $K_0$ is a number of the pulses outputted by the incremental encoder when the permanent magnet synchronous motor rotates for one revolution.

In another embodiment, the device for measuring speed of a permanent magnet synchronous motor further includes an interruption timer 105. the current measuring period is started and terminated by the interruption timer 105. The length T of the current measuring period equals to a ratio of a preset value of the interruption timer to an interruption clock frequency.

Figure 5:
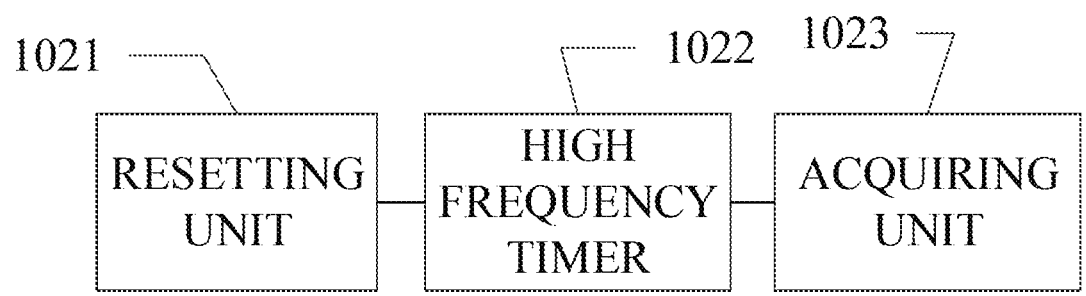
FIG. 5 is a block diagram of a timing module of the device of FIG. 4.

As shown in FIG. 5, the timing module 102 includes a resetting unit 1021, a high frequency timer 1022 and an acquiring unit 1023. The resetting unit 1021 is used to reset the high frequency timer 1022 when receiving the pulse outputted by the incremental encoder. The high frequency timer 1022 increments a count value if the permanent magnet synchronous motor rotates in a forward direction, and decrements a count value if the permanent magnet synchronous motor rotates in a reverse direction. The acquiring unit 1023 is used to acquire a time value from the high frequency timer 1022 when the current measuring period ends.

Further, the high frequency timer 1022 includes a register (not shown). The time value from the high frequency timer 1022 equals to a ratio of the count value in the register of the high frequency timer to clock frequency of the high frequency timer 1022.

Figure 6:
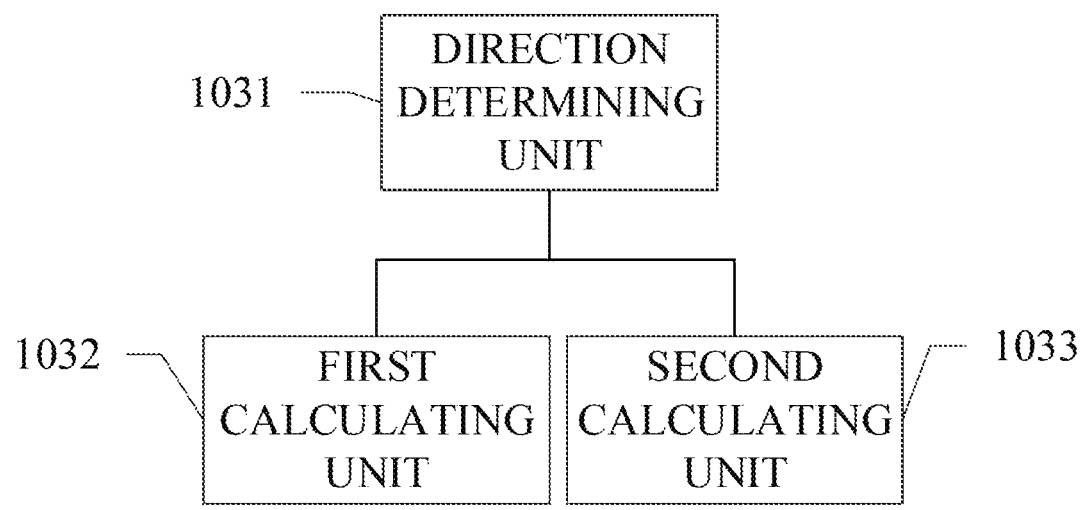
FIG. 6 is a block diagram of a first calculating module of the device of FIG. 4.

Further, as shown in FIG. 6, the first calculating module 103 includes a direction determining module 1031, a first calculating unit 1032 and a second calculating unit 1033.

The direction determining module 1031 is configured to select the first calculating unit 1032 or the second calculating unit 1032.

The first calculating unit 1032 is used to, when the permanent magnet synchronous motor rotates in a forward direction, calculate the third duration T0 according to the following formula: $T0=T-S_n+S_{n-1}$.

The second calculating unit 1033 is used to, when the permanent magnet synchronous motor rotates in a reverse direction, calculate the third duration T0 according to the following formula: $T0=T-S_{n-1}+S_n$.

The device in the present embodiment and the method in the foregoing embodiment are two aspects based on the same inventive concept. Since the method has been described in detail, those skilled in the art can clearly understand, according to the foregoing description, the system structure which will not be repeated here for the sake of simplicity.

For the sake of convenience of description, the above device is described in terms of functions described in various modules. The functionality of each module may be implemented in the same or more software and/or hardware when implementing the present invention.

As will be understood from the description of the above embodiments, it will be apparent to those skilled in the art that the present invention can be realized by means of software plus a common hardware platform. Based on this understanding, the technical solution of the present invention, or the improvement relative to the prior art, may be embodied in the form of a software product which may be stored in a storage medium such as ROM/RAM, disc, CD, etc., including a number of instructions for enabling a computer device (which may be a personal computer, a server, or a network device, etc.) to perform the methods described in certain portions of the various embodiments or embodiments of the present invention.

The described embodiment of the device is merely illustrative. The modules or units described as separate components may or may not be physically separate, and the components indicated as modules or units may or may not be physical modules. They can be located in one place, or can be distributed to multiple network modules. Part or all of the elements may be selected according to the actual needs to achieve the object of the present embodiment. One of ordinary skill in the art will understand and practice without creative work.

The present invention may be used in a number of general purpose or special computing system environments or configurations, such as personal computers, server computers, handheld devices or portable devices, tablet computer devices, multiprocessor systems, microprocessor-based systems, set-top boxes, programmable consumer electronics devices, web PCs, small computers, large computers, distributed computing environments including any of the above system or device, as in the following embodiment.

Embodiment 3

Figure 7:
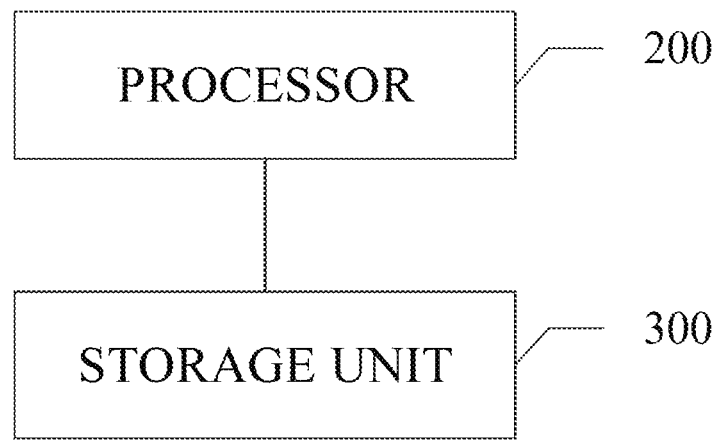
FIG. 7 is a block diagram of a device for measuring the speed of a permanent magnet synchronous motor according to another embodiment.

A device for measuring speed of a permanent magnet synchronous motor, as shown in FIG. 7, includes a processor 200 and a storage unit 300 for storing plurality of program instructions executable by the processor 200.

The processor 200 is configured to execute the program instructions to perform the following steps:

acquiring a number K of pulse signals received in a current measuring period and outputted by an incremental encoder, where K is not equal to 0 and the current measuring period has a length of T;

acquiring a first duration $S_{n-1}$ measured between a time point when a pulse is last received in a previous measuring period and a time point when the previous measuring period ends, and a second duration $S_n$ measured between a time point when a pulse is last received in the current measuring period and a time point when the current measuring period ends;

calculating a third duration T0, measured between the time point when the pulse is last received in the previous measuring period and the time point when the pulse is last received in the current measuring period, according to the length T of the current measuring period, the first duration $S_{n-1}$ and the second duration $S_n$; and calculating a motor speed v according to the following formula:

$$v = \frac{K}{K_0} \times \frac{1}{T0},$$

where $K_0$ is a number of the pulses outputted by the incremental encoder when the permanent magnet synchronous motor rotates for one revolution.

In another embodiment, the processor 200 is configured to execute the program instructions to perform the following steps:

resetting a high frequency timer when receiving the pulse outputted by the incremental encoder;

the high frequency timer incrementing a count value if the permanent magnet synchronous motor rotates in a forward direction;

the high frequency timer decrementing a count value if the permanent magnet synchronous motor rotates in a reverse direction; and acquiring a time value from the high frequency timer when the current measuring period ends.

The device in the present embodiment and the method in the foregoing embodiment are two aspects based on the same inventive. Since the method has been described in detail those skilled in the art can clearly understand, according to the foregoing description, the system structure which will not be repeated here for the sake of simplicity.

The device of the present embodiment has the advantages that, by acquiring a first duration $S_{n-1}$ measured between a time point when a pulse is last received in a previous measuring period and a time point when the previous measuring period ends, and a second duration $S_n$ measured between a time point when a pulse is last received in the current measuring period and a time point when the current measuring period ends, the exact time corresponding to the motor rotation angle represented by the K complete pulse signals is accurately calculated, and the speed of the permanent magnet synchronous motor can be detected more accurately without being affected no matter whether the motor runs at high speed or low speed.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A method for measuring speed of a permanent magnet synchronous motor, comprising:
   providing a device electronically coupled to an incremental encoder of the permanent magnet synchronous motor;
   acquiring, by the device, a number K of pulse signals received in a current measuring period and outputted by the incremental encoder, the current measuring period having a length of T;
   acquiring a first duration $S_{n-1}$ measured between a time point when a pulse is last received in a previous measuring period and a time point when the previous measuring period ends, and a second duration $S_n$ measured between a time point when a pulse is last received in the current measuring period and a time point when the current measuring period ends;
   calculating a third duration T0, measured between the time point when the pulse is last received in the previous measuring period and the time point when the pulse is last received in the current measuring period, according to the length T of the current measuring period, the first duration $S_{n-1}$ and the second duration $S_n$; and
   calculating a motor speed v according to the following formula:

$$v = \frac{K}{K_0} \times \frac{1}{T0},$$

where $K_0$ is a number of the pulses outputted by the incremental encoder when the permanent magnet synchronous motor rotates for one revolution;
   wherein the step of acquiring the second duration $S_n$ measured between the time point when the pulse is last received in the current measuring period and the time point when the current measuring period ends, comprises:
   resetting a high frequency timer when receiving the pulse outputted by the incremental encoder;
   the high frequency timer incrementing a count value if the permanent magnet synchronous motor rotates in a forward direction;
   the high frequency timer decrementing a count value if the permanent magnet synchronous motor rotates m a reverse direction; and
   acquiring a time value from the high frequency timer as the second duration $S_n$ when the current measuring period ends.

2. The method of claim 1, wherein the current measuring period is started and terminated by the interruption timer, the length T of the current measuring period equals to a ratio of a preset value of the interruption tinier to an interruption clock frequency, and the time value from the high frequency tinier equals to a ratio of the count value in a register of the high frequency timer to clock frequency of the high frequency timer.

3. The method of claim 1, wherein the step of acquiring the number K of pulse signals received in the current measuring period and outputted by the incremental encoder comprises:
   setting a value of a counter that acquires the pulse signals to zero when the current measuring period starts, and the value of the counter when the current measuring period ends is determined to be the number of pulse signals received in the current measuring period and outputted by the incremental encoder.

4. The method of claim 1, wherein the step of calculating the third duration T0, measured between the time point when the pulse is last received in the previous measuring period and the time point when the pulse is last received in the current measuring period, comprises:
   when the permanent magnet synchronous motor rotates in a forward direction, the third duration T0 is calculated according to the following, formula: $T0=T-S_n+S_{n-1}$;
   when the permanent magnet synchronous motor rotates in a reverse direction, the third duration T0 is calculated according to the following formula: $T0=T-S_{n-1}+S_n$.

5. A device for measuring speed of a permanent magnet synchronous motor, wherein the device is electronically coupled to an incremental encoder of the permanent magnet synchronous motor, and the device comprises:
   a counter configured to acquire a number K of pulse signals received in a current measuring period and outputted by the incremental encoder, the current measuring period having a length of T;
   a timing module configured to acquire a first duration $S_{n-1}$ measured between a time point when a pulse is last received in a previous measuring period and a time point when the previous measuring period ends, and a second duration $S_n$ measured between a time point when a pulse is last received in the current measuring period and a time point when the current measuring period ends;
   a first calculating module configured to calculate a third duration T0, measured between the time point when the pulse is last received in the previous measuring period and the time point when the pulse is last received in the current measuring period, according to the length T of the current measuring period, the first duration $S_{n-1}$ and the second duration $S_n$; and
   a second calculating module configured to calculate a motor speed v, according to the following formula:

$$v = \frac{K}{K_0} \times \frac{1}{T0},$$

where $K_0$ is a number of the pulses outputted by the incremental encoder when the permanent magnet synchronous motor rotates for one revolution;
   wherein the first calculating module comprises a direction determining module, a first calculating unit and a second calculating unit;
   the direction determining module is configured to select the first calculating unit or the second calculating unit;
   the first calculating unit is configured to, when the permanent magnet synchronous motor rotates in a forward direction, calculate the third duration T0 according to the following formula: $T0=T-S_n+S_{n-1}$; and
   the second calculating unit is configured to, when the permanent magnet synchronous motor rotates in a reverse direction, calculate the third duration T0 according to the following formula: $T0=T-S_{n-1}+S_n$.

6. The device of claim 5, wherein the timing module comprises a resetting unit and a high frequency timer, the resetting unit is configured to reset the high frequency timer when receiving the pulse outputted by the incremental encoder, and the high frequency timer increments a count value if the permanent magnet synchronous motor rotates in a forward direction, and decrements a count value if the permanent magnet synchronous motor rotates in a reverse direction.

7. The device of claim 6, further comprising an interruption timer, wherein the current measuring period is started and terminated by the interruption timer, the length T of the current measuring period equals to a ratio of a preset value of the interruption timer to an interruption clock frequency, the high frequency timer comprises a register, and the time value from the high frequency timer equals to a ratio of the count value in the register of the high frequency timer to clock frequency of the high frequency timer.

8. A device for measuring speed of a permanent magnet synchronous motor, comprising:
    a processor electronically coupled to an incremental encoder of the permanent magnet synchronous motor; and
    a storage unit for storing a plurality of program instructions that, when executed by the processor, perform the steps of:
    acquiring a number K of pulse signals received in a current measuring period and outputted by the incremental encoder, the current measuring period having a length of T;
    acquiring a first duration $S_{n-1}$ measured between a time point when a pulse is last received in a previous measuring period and a time point when the previous measuring period ends, and a second duration $S_n$ measured between a time point when a pulse is last received in the current measuring period and a time point when the current measuring period ends;
    calculating a third duration T0, measured between the time point when the pulse is last received in the previous measuring period and the time point when the pulse is last received in the current, measuring period, according to the length T of the current measuring period, the first duration $S_{n-1}$ and the second duration $S_n$; and
    calculating a motor speed v according to the following formula:

$$v = \frac{K}{K_0} \times \frac{1}{T0},$$

where $K_0$ is a number of the pulses outputted by the incremental encoder when the permanent magnet synchronous motor rotates for one revolution;
wherein the step of acquiring the second duration $S_n$ measured between the time point when the pulse is last received in the current measuring period and the time point when the current measuring period ends, comprises:
resetting a high frequency timer when receiving the pulse outputted by the incremental encoder;
the high frequency timer incrementing a count value if the permanent magnet synchronous motor rotates in a forward direction;

the high frequency timer decrementing a count value if the permanent magnet synchronous motor rotates in a reverse direction; and
acquiring a time value from the high frequency timer as the second duration $S_n$ when the current measuring period ends.

9. The method of claim 2, wherein the interruption clock frequency is less than the clock frequency of the high frequency timer.

10. The method of claim 1, wherein in response to a maximum rotation angle of the motor being not 360 degrees, $K_0$ is determined according to the proportion between the maximum, rotation angle and 360 degree-degrees.

11. The device of claim 5, wherein the counter is further configured to set a value of a counter that acquires the pulse signals to zero when the current measuring period starts, and the value of the counter when the current measuring period ends is determined to be the number of pulse signals received in the current measuring period and outputted by the incremental encoder.

12. The device of claim 7, wherein the interruption clock frequency is less than the clock frequency of the high frequency timer.

13. The device of claim 5, wherein in response to a maximum rotation angle of the motor being not 360 degrees, $K_0$ is determined according to the proportion between the maximum rotation angle and 360 degrees.

14. The device of claim 8, wherein the current measuring period is started and terminated by an interruption timer, the length T of the current measuring period equals to a ratio of a preset value of the interruption timer to an interruption clock frequency, and the time value from the high frequency timer equals to a ratio of the count value in a register of the high frequency timer to clock frequency of the high frequency timer.

15. The device of claim 8, wherein the step of acquiring the number K of pulse signals received in the current measuring period and outputted by the incremental encoder comprises:
    setting a value of a counter that acquires the pulse signals to zero when the current measuring period starts, and the value of the counter when the current measuring period ends is determined to be the number of pulse signals received in the current measuring period and outputted by the incremental encoder.

16. The device of claim 8, wherein the step of calculating the third duration T0, measured between the time point when the pulse is last received in the previous measuring period and the time point when the pulse is last received in the current measuring period, comprises:
    when the permanent magnet synchronous motor rotates in a forward direction, the third duration T0 is calculated according to the following formula: $T0=T-S_n+S_{n-1}$;
    when the permanent magnet synchronous motor rotates in a reverse direction, the third duration T0 is calculated according to the following formula: $T0=T-S_{n-1}+S_n$.

17. The device of claim 14, wherein the interruption clock frequency is less than the clock frequency of the high frequency timer; and in response to a maximum rotation angle of the motor being not 360 degrees, $K_0$ is determined according to the proportion between the maximum rotation angle and 360 degrees.

* * * * *